OFFSHORE PLATFORMS

This invention relates to support structures for offshore platforms, such as drilling platforms, and in particular concerns a support structure for an offshore platform which is suitable for use in relatively deep water, e.g. of 600 ft. or more. The invention also relates to offshore structures embodying a platform and a support structure according to the invention.

With the discovery of oil under the bed of the North Sea, much time has been devoted to the designing of offshore drilling and other platforms and their support structures which are suitable for operation in this particular stretch of water, which is notorious for its widely varying conditions.

One form of offshore structure in use, includes a buoyant substructure held submerged under the water by being tied to the ocean floor by tie ropes, wires or the like. The platform proper is mounted on the substructure on legs so as to lie clear of the surface of the water. This structure has the disadvantage that is can break loose in the event of breakage of the tie ropes and become unstable, and, furthermore, as its stability depends upon a buoyant substructure, its stability will, we feel, be seriously affected due to water currents and wave motions in high seas.

An object of the present invention is to provide an offshore platform support structure which stands in the sea bed, but which is capable of yielding under the action of wave motions to a predetermined extent in order to prevent damage from being imparted thereto in high seas.

According to the invention there is provided an offshore platform support structure comprising a column structure for standing on the sea bed, the structure being in at least two sections which are relatively tiltable from an initial position in a plane or planes which is or are transverse to the column axis by the sections being located one relative to the other by joint means defining circumferentially arranged tilting axes about which the sections are relatively tiltable, the structure further including damping means arranged to control the rate of return of said sections to the initial position from a relatively tilted position. The structure may include yieldable tensioning means urging the sections axially together and resisting said relative tilting.

Preferably, the said joint means comprises circumferentially arranged knuckle type joints.

Preferably also, each pair of circumferentially adjacent joints defines an axis about which the sections are relatively tiltable.

Preferably also, there are three column sections, a lower section, an intermediate section and an upper section, the lower section and intermediate section being located one relative to the other by knuckle type joints, and the intermediate section and upper section being located one relative to the other by knuckle type joints, the tilting axes between the lower and intermediate sections being angularly offset relative to the axes of relative tilting between the intermediate and upper sections.

Preferably, there are three ball and socket type joints defining the knuckle type joints between the lower section and the intermediate section and three similar joints between the intermediate section and upper section.

Alternatively, the joints may be defined by straight ribs lying in straight bar sockets and adapted to knuckle therein as the relative tilting takes place.

When one of the tiltable sections tilts under wave loading, there is stored up energy in the tension cables (where provided) and additionally the wave forces being cyclic, reverse, and act to return the tilted section to the untilted position and as these sections are relatively massive, if the section is accelerated by these returning forces, considerable impact loads can arise, which could cause damage to the section on which the section being returned to the untilted position, stands, were it not for the provision of the damping means.

The damping means may be a plurality of dash-pot type dampers connected between relatively tillable sections, the sea water serving as the damping fluid, but in a particularly suitable arrangement, the damping means are embodied in the apparatus in the region of the said knuckle joints and where each knuckle joint comprises of head and a socket, the damping may be achieved by arranging for the socket to have restriction apertures through which water is forced when the head and socket were back into seating relationship after a relative fitting movement separating the head and socket of each such joint, the head and socket may be capable of limited sliding movement transversely of the structure to facilitate location of each head in to socket after separation as a result of a relative tilling movement.

Preferably the damping means is variable so that the damping effect thereof increases, preferably automatically, the nearer the tiltable section gets to the initial position so that it will sit softly in the initial position and will not go overcentre.

An embodiment of the present invention will now be described by way of example, with reference to the accompanying diagrammatic drawings, wherein.

Figure 2:
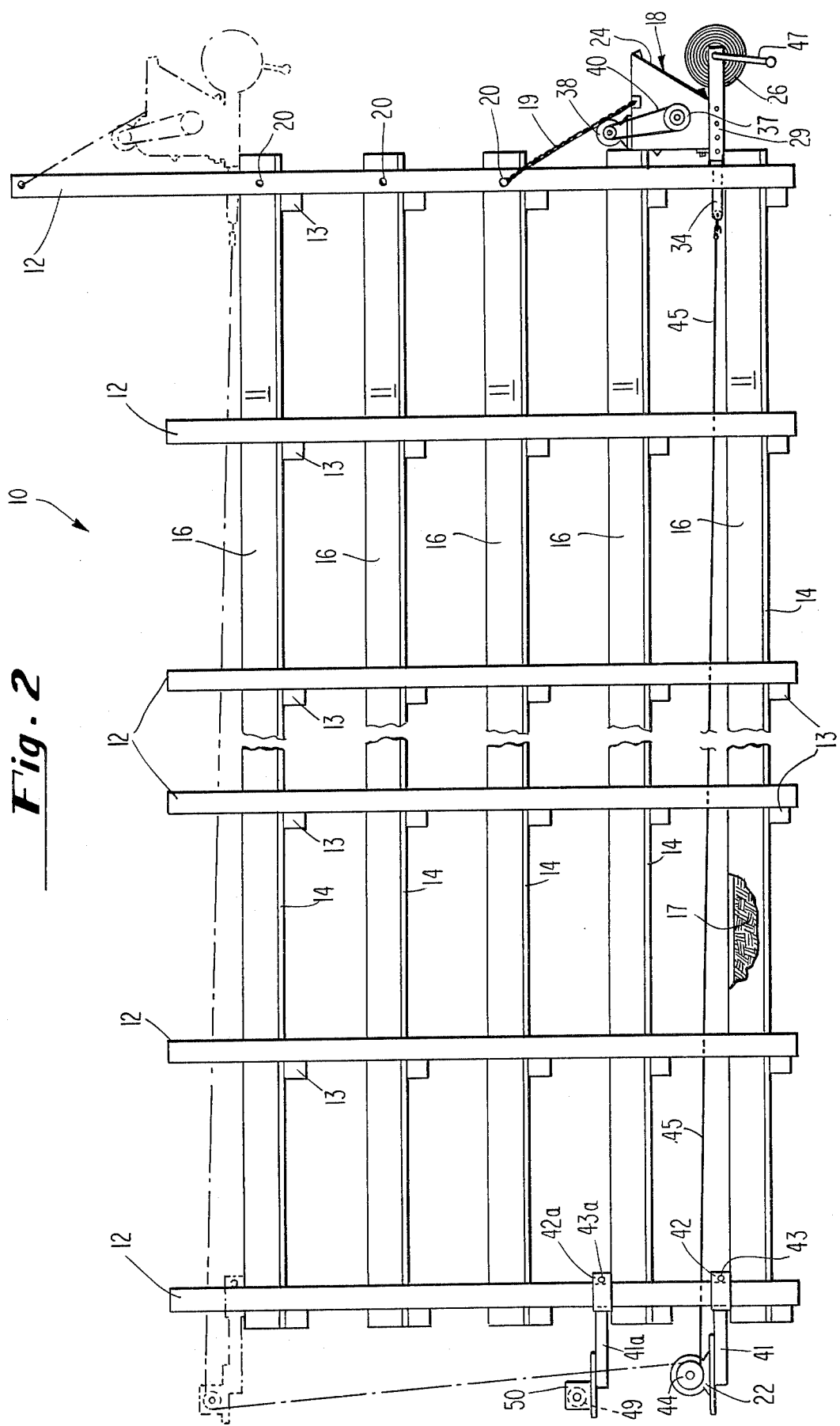
FIG. 2 is a side view of the platform and its supporting structure.

FIGS. 3, 4, 5 and 6 respectively are sectional diagrammatic plan views on the section lines I—I, II—II, III—III and IV—IV respectively as shown in FIG. 2;

FIG. 7 is a sectional diagrammatic side view of the structure at one of the knuckle joints, the section being taken on line V—V of FIG. 4;

FIG. 8 is a sectional side view of the ball and its mounting of the joint shown in FIG. 7 the section being taken on line VI—VI of FIG. 7;

FIG. 9 is a diagrammatic view showing how the ball and socket of the joint shown in FIG. 7 come together after a relative tilting movement of the sections of the structure which separates said ball and socket.

Referring to the drawings, an offshore structure 10 which may be a drilling or service structure or the like includes an upright column when in the in use position. The column essentially is three sections, namely a lower section defined by base storage tanks 12, an intermediate section 14 made up of two heavy triangular frames 16 and 18 which are spaced apart by axially inclined braces 20, and an upper section 22 which is in the form of a triangular frame 22A, a cylindrical central spar 22B, brace rods 22D and support bars 22C. On top of section 22 is a platform structure 24 on which the appropriate derricks, buildings, tanks and the like, as the case requires, will be mounted. The drawings show platforms 24 serving for the filling of a tanker 23 with oil.

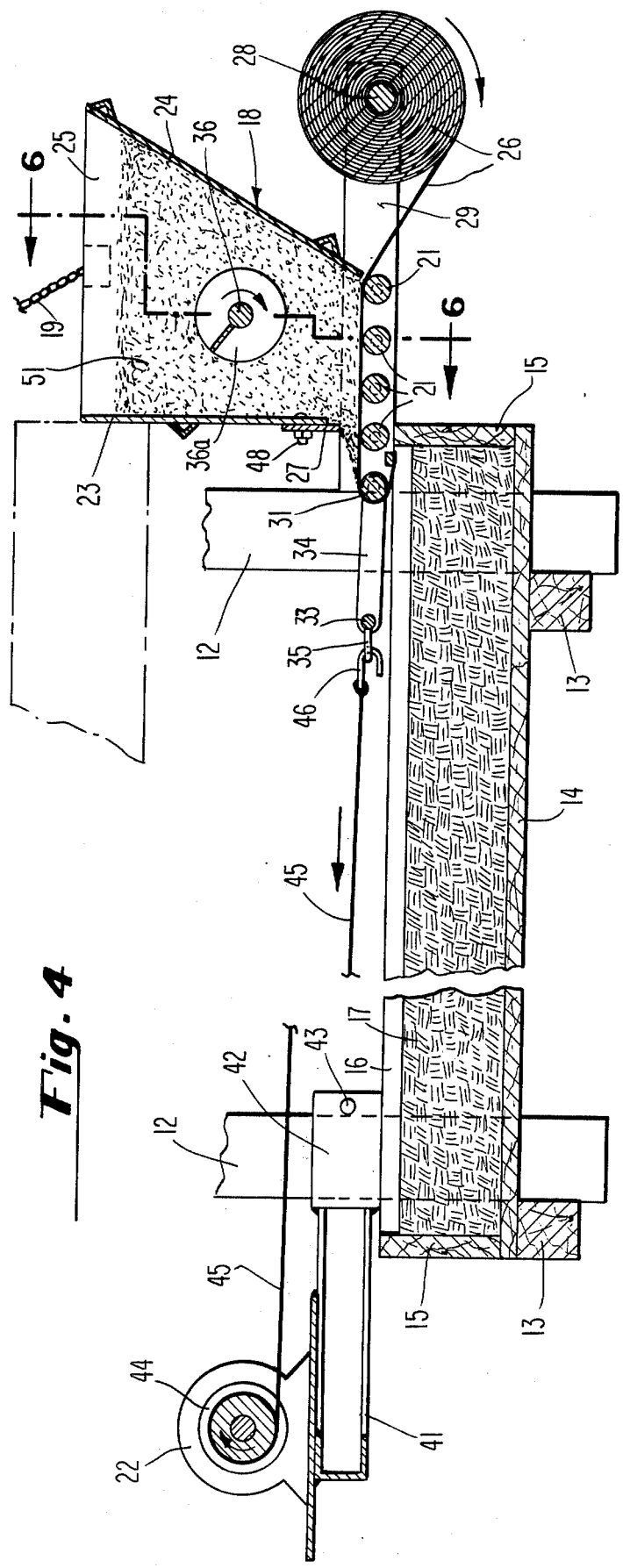
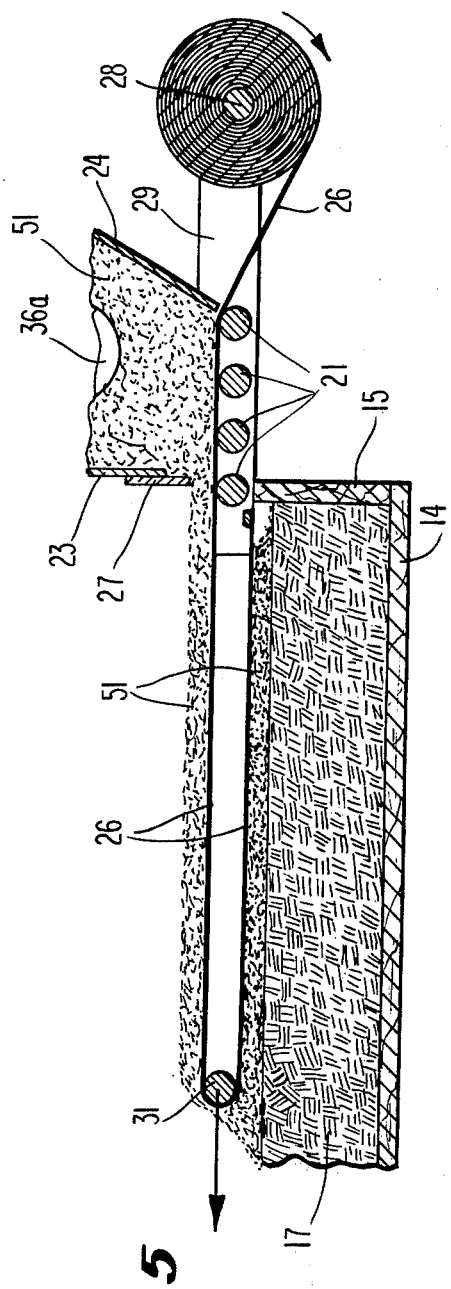
Fig. 4
Fig. 5

1

MUSHROOM FARMING APPARATUS AND METHOD

BRIEF SUMMARY OF THE INVENTION

In mushroom culture it is customary to utilize a number of separate mushroom beds for growing the crop. These beds are traditionally formed in an enclosed space having certain natural or controlled climatic conditions. Therefore, to economize the enclosed space, mushroom beds are carefully designed for maximum production. This has led to the conventionally constructed mushroom frames containing a plurality of mushroom beds which are each accessible for the purposes of making the bed, growing the mushrooms and harvesting the crop.

Normally, a mushroom bed is formed from fresh compost which is formulated as needed by the grower. After the compost is deposited in the bed, mushroom spawn is distributed therein by conventional means. Finally, the bed is completed by applying a uniform layer of casing soil on top of the spawned compost to provide the medium in which the crop will mature. Heretofore the application of casing soil to the closely spaced mushroom beds has been an arduous and time consuming manual process including measuring, raking and levelling of the soil.

It is an object of this invention to provide an apparatus for applying a level layer of casing soil uniformly throughout the length of a mushroom bed on top of the composted and spawned bed.

It is another object of this invention to provide an apparatus for introducing a level layer of compost into a mushroom bed.

It is another object of this invention to provide a method of continuously applying a level layer of compost in a mushroom bed and to provide a method of continuously applying a level layer of casing soil uniformly throughout the length of a mushroom bed on top of the compost soil by mechanical means.

Figure 1:
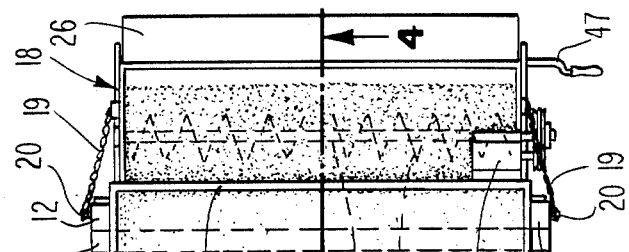
FIG. 1 is a perspective view illustrating the geometry of the platform supporting structure.
Figure 3:
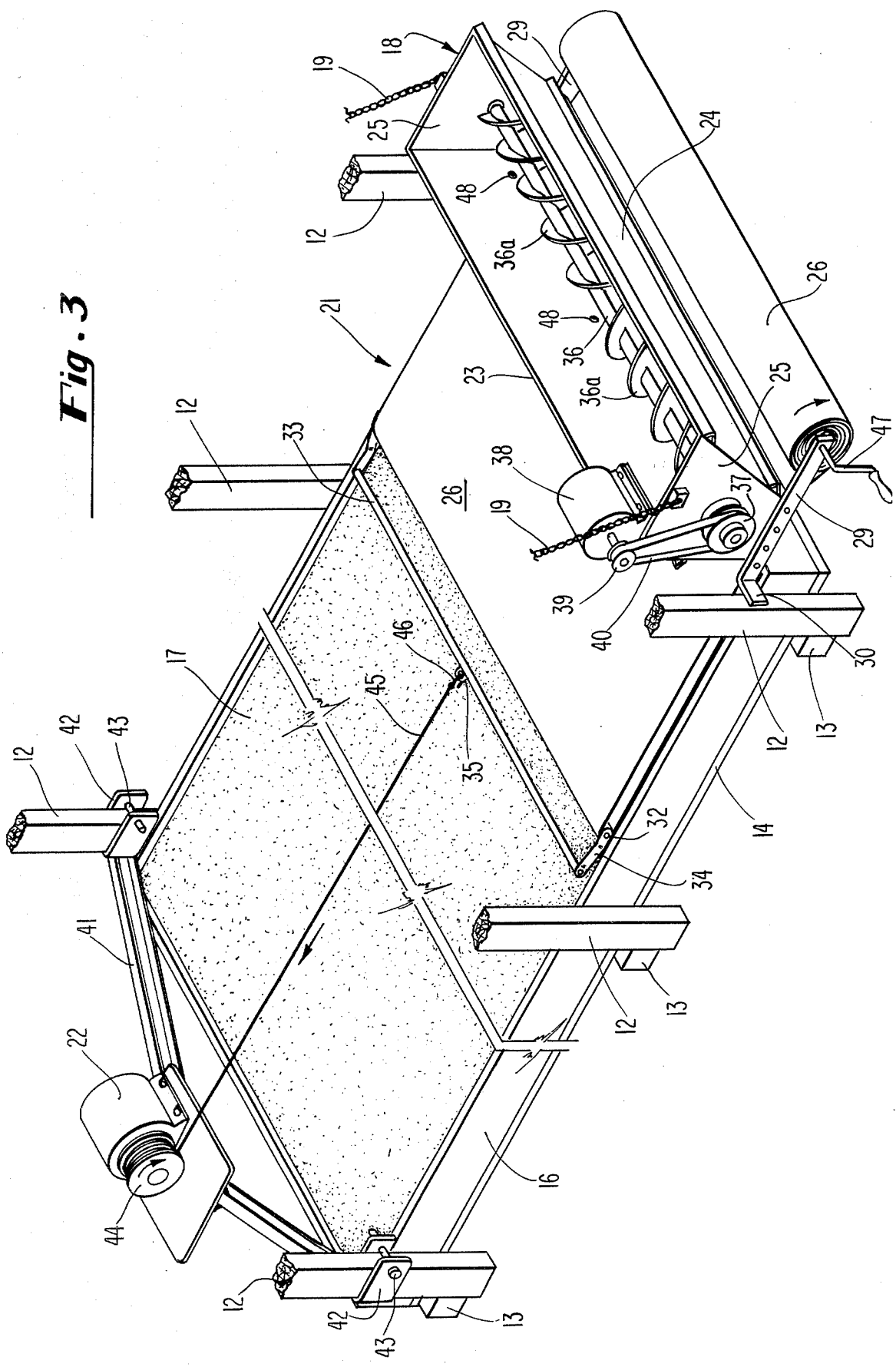

These and other objects of this invention have been accomplished by the apparatus and method of this invention shown in the accompanying drawings, wherein, FIG. 1 is a top plan view of a mushroom frame utilizing the apparatus and method of my invention;

FIG. 2 is a side elevational view of a mushroom frame utilizing the apparatus and method of my invention;

FIG. 3 is a broken perspective view of the apparatus of my invention showing the apparatus and method thereof in certain detail;

FIG. 4 is a partial vertical sectional view taken in the direction of the lines and arrows 4—4 of FIG. 1;

FIG. 5 is an elevational view of certain details of the apparatus of my invention during the operation thereof; and FIG. 6 is an enlarged top plan view of a portion of the apparatus of my invention.

DETAILED DESCRIPTION OF THE DRAWINGS

Referring now to FIGS. 1 and 2, there is shown an elongated frame 10 for supporting a plurality of mushroom beds 11 in vertically stacked parallel arrangement. Frame 10 consists of a plurality of vertical stiles 12 and a plurality of horizontal crossmembers 13. Each bed 11 consists of a floor 14, a pair of end walls 15 and a pair of side walls 16. During the cultivation of mushrooms, each bed 11 is partially filled with compost 17. The apparatus of this invention comprises in combination with a frame supported mushroom bed a hopper 18 adapted to be detachably mounted on the frame 11 by means of chains 19 and bolts 20; flexible sheet means adapted to accept pulverulent material discharged from the hopper 18 in a manner so as to deposit said pulverulent material in a continuous layer of compost 17 in a bed 11 or in a continuous layer of casing material on top of said compost 17 throughout the length of said bed and detachable winch means 22 for activating said sheet means.

In the drawings, hopper 18 is shown comprising a front wall 23, a back wall 24 and tapering end walls 25. The top and bottom of hopper 18 are open, however, a bottom measuring means is formed by the combination of flexible sheet 26 and an adjustable doctor plate 27. The flexible sheet 26 is stored for delivery and retraction on a journalled roller 28 which is mounted between extension brackets 29, which are affixed to tapering end walls 25. Also journalled in extension brackets 29 are several supporting rollers 21 which provide a level path for the flexible sheet 26. Brackets 29 are formed with an out-turned distal flange 30, which flanges in combination with the chains 19 and bolts 20 detachably support the hopper 18 in juxtaposition to each of the beds 11, outboard of frame 10.

The end of sheet 26 not secured to roller 28 is adapted to extend away from the front wall 23 of hopper 18, is retroverted about a roller 31, and secured throughout its entire width to the body of hopper 18. Roller 31 is sleeved on shaft 32, which is in turn supported by a yoke formed of a cross-bar 33 and side-arms 34. Centrally of cross-bar 33 is formed a shackle 35.

Hopper 18 has mounted longitudinally therein a mixing auger 36, having opposed helical flights 36a formed thereon. Auger 36 is journalled in end walls 25, through one of which the auger 36 is extended and provided with a driven pulley 37. A motor 38 is mounted on top of hopper 18 so as to provide means for driving the auger 36. This is accomplished by means of a driving pulley 39 affixed to the drive shaft of motor 38 and drive belt 40.

In accordance with the apparatus and method of this invention, winch 22 is detachably supported by a bracket 41 including grips 42 and pins 43 outboard of the end of frame 10 opposite from which hopper 18 is mounted. Winch 22 is provided with a drive drum 44 having affixed thereto a suitably amount of a cable 45, which is conveniently attached to shackle 35 by a hook 46.

For convenience in accumulating the flexible sheet 21 upon roller 28, a crank 47 extends therefrom through bracket 29. The doctor plate 27 is slotted so as to be adjustably mounted on front wall 23 by means of nut and bolt sets 48. An auxiliary pulley 49 is journalled in a block 50, which is mounted on a bracket 41a that is detachably supported on frame 10 by grips 42a and pins 43a. When bracket 41 and bracket 41a are each mounted in a vertical spaced relationship upon the frame 11 a plane passing generally through the center of beds 11 longitudinally includes pulley 49 and drum 44.

The operation of the apparatus and method of this invention may be readily understood from the several drawings. At the start of a mushroom crop, the beds 11 are partially filled with compost 17. Sometime after the mushroom spawn is distributed in the compost 17, the step of covering the compost 17 with casing soil 51 is carried out. Initially, a hopper 18 is attached to the compost of frame 10 as shown in FIGS. 1, 2 and 4. An amount of casing soil 51 sufficient to cover the compost 17 is deposited in the hopper 18. Alternatively, the hopper 18 may be continuously charged with casing soil 51 at a rate sufficient to provide the necessary amount thereof to adequately cover the compost 17 in accordance with the method of this invention. The crank 17 is operated so as to substantially fully retract sheet 26 upon roller 28 as shown in FIG. 1. Hook 46 is placed in shackle 35 so as to position the line 45. As shown in FIG. 1, the casing soil 51 is allowed to issue from the bottom of hopper 18 in an amount determined as to its thickness by the doctor plate 27 and sheet 26. The winch 22 is then operated so as to withdraw sheet 26 from the storage roller 28 as shown in FIG. 2. By reason of the relative juxtaposition of the winch 22, sheet 26, hopper 18 and bed 11, as sheet 26 is withdrawn, a layer of casing soil 51 is continuously formed on top of sheet 26 and continuously deposited on top of the compost 17 across the full width of the bed 11. It may readily be understood therefore, that casing soil 51 need only issue from the hopper 18 onto the moving sheet 26 until the retroverted edge of sheet 26 has traversed a distance equal to half of the length of bed 11. At that point in time there will be an amount of casing soil on top of sheet 26 equal to that which is needed to completely cover the compost 17 as the cross-bar 33 is pulled to the opposite end wall 15 from hopper 18 by the winch 22, cable 45 and hook 46. During the delivery of the casing soil 51 from hopper 18, the auger 36 causes uniform mixing of the soil 51 to occur, thereby ensuring a uniform casing soil layer on top of the compost 17. After the covering of one bed 11 in this manner, sheet 26 is retracted upon roller 28. The hook 46 is detached, and the hopper 18 is removed from its position and replaced at the end of another bed 11, as shown in phantom lines in FIG. 2, through the use of chains 19 and bolts 20. In this phantom position, hopper 18 may again be loaded with casing soil. Bracket 41a is then placed in the phantom position shown in FIG. 2 by means of grips 42a and pins 43a, and cable 45 is led over auxiliary pulley 49 to that hook 46 may be re-attached shackle 35. As now positioned, the operation of winch 22 will again cause sheet 26 to be withdrawn from roller 28, with the resultant covering of another composted bed 11.

The foregoing method may be repeated as often as necessary in order to fully cover all composted beds 11 with casing soil 51.

By the use of the apparatus and method of this invention much hand labor may be eliminated from the mushroom growing industry.

It will likewise be apparent from the foregoing description that the apparatus and method of this invention may be utilized to originally fill mushroom beds with compost. In such use, the doctor plate 27 must be adjusted so as to allow the proper thickness of the compost 17 layer to issue from the hopper 18. In normal practice, a six inch layer of compost is first laid, and the casing soil is normally laid in a one inch layer.

Among the advantages resulting from the use of the apparatus and process of this invention is the improvement of the mushroom harvest since the layer of casing soil produced is significantly more uniform in thickness than that produced by hand. As a result, the budding mushrooms emerge from the casing soil throughout the bed as an "even break", thereby facilitating the harvest.

Having thus described my invention, I claim:

1. An apparatus for applying compost or casing soil to mushroom beds, which apparatus comprises:
   (a) hopper means adapted to hold a quantity of casing soil or compost, said hopper having a discharge opening formed by a fixed portion thereof and a movable flexible sheet portion attached thereto, which sheet portion is adapted to be moved horizontally away from the discharge opening,
   (b) detachable means adapted to position the hopper means in juxtaposition outboard of the end of a mushroom bed,
   (c) roll means adapted to contain a rolled supply of said flexible sheet,
   (d) supporting means adapted to horizontally support a portion of said flexible sheet so as to form said discharge opening,
   (e) cross-bar means adapted to have the flexible sheet retroverted thereabout wherein the end of the flexible sheet free of said roll means is secured to a portion of said hopper means, whereby upon traction being applied to said cross-bar the sheet is moved horizontally away from said discharge opening in a direction normal thereto and withdrawn from said roll means,
   (f) continuous cable means provided with means for attachment to said cross-bar means,
   (g) winch means adapted to contain and wind said cable means thereon, whereby upon operation of said winch means when said cable means is attached to said cross-bar means any properly sized pulverulent material contained in said hopper is discharged therefrom in a continuous layer upon said horizontally moving sheet portion, which layer is thereupon continuously dropped from the retroverted edge of the sheet portion.

2. The apparatus of claim 1, wherein said hopper means has power means affixed thereto adapted to mechanically mix any pulverulent material contained therein.

3. Apparatus for applying compost or casing soil to a plurality of mushroom beds supported by a vertical frame, which apparatus comprises:
   (a) structural frame,
   (b) a plurality of identical elongated mushroom beds each consisting essentially of a floor, side walls and end walls, said beds being supported by said frame in overlying relationship and spaced apart vertically,
   (c) a hopper means adapted to hold a quantity of compost or casing soil, said hopper having a discharge opening formed by a fixed portion thereof and a movable flexible sheet portion attached thereto, which sheet portion is adapted to be moved horizontally away from the discharge opening and along the length of a bed,
   (d) detachable means adapted to position the hopper means in juxtaposition outboard of the end of a mushroom bed,
   (e) roll means adapted to contain a rolled supply of said flexible sheet,
   (f) supporting means adapted to horizontally support a portion of said flexible sheet so as to form said discharge opening,
   (g) cross-bar means adapted to have the flexible sheet retroverted thereabout wherein the end of the flexible sheet free of said roll means is secured to a portion of said hopper means, whereby upon traction being applied to said cross-bar the sheet is moved horizontally away from said discharge opening in a direction normal thereto and withdrawn from said roll means, (h) continuous cable means provided with means for attachment to said cross-bar means, (i) winch means adapted to be mounted upon said frame at the end thereof opposite from which the hopper is positioned and adapted to wind said cable means thereon, whereby upon operation of said winch means when said cable means is attached to said cross bar means any properly sized pulverulent material contained in said hopper is discharged therefrom in a continuous layer upon said horizontally moving sheet portion, which layer is thereupon continuously dropped from the retroverted edge of the sheet portion so as to form a continuous layer of compost or casing soil in the mushroom bed adjacent to which the hopper is positioned.

4. A method of delivering a layer of compost or casing soil into a mushroom bed comprising the steps of:

(a) providing a supply of compost or casing soil contiguous to one end of a mushroom bed, said supply being in an amount sufficient to cover said bed to a uniform thickness, (b) discharging said compost or casing soil from said supply by gravity and continuously forming a layer of said compost or casing soil having a uniform thickness and a width substantially that of the mushroom bed, (c) receiving said discharged layer of compost or casing soil onto a moving flexible sheet while said sheet moves from a position adjacent said supply means to the end of said mushroom bed opposite the supply, and (d) continuously retroverting the moving sheet at the advancing edge thereof so as to discharge said layer of compost or casing soil progressively by gravity onto the mushroom bed.

* * * * *